United States Patent [19]

Schmidt et al.

[11] Patent Number: 4,794,750
[45] Date of Patent: Jan. 3, 1989

[54] METHOD FOR MAKING CONTAINERS HAVING PORTS

[75] Inventors: Josef Schmidt, Libertyville; David A. Winchell, Spring Grove, both of Ill.

[73] Assignee: Baxter Travenol Laboratories, Inc., Deerfield, Ill.

[21] Appl. No.: 750,042

[22] Filed: Jun. 27, 1985

Related U.S. Application Data

[63] Continuation of Ser. No. 536,608, Sep. 28, 1983, abandoned.

[51] Int. Cl.[4] ............................................. B29C 45/16
[52] U.S. Cl. ........................................ 53/410; 53/455;
493/191; 493/211; 493/213; 493/339; 493/929;
264/138; 264/160; 264/259; 264/264; 264/266;
264/255
[58] Field of Search ............... 264/511, 513, 516, 255, 264/259, 264, 266, DIG. 41, 268; 53/410, 455; 493/191, 211, 213, 339, 929

[56] References Cited

U.S. PATENT DOCUMENTS

| 2,900,665 | 8/1959 | Walker | 264/DIG. 41 |
|---|---|---|---|
| 2,903,388 | 9/1959 | Jonke et al. | |
| 3,122,598 | 2/1964 | Berger | 264/266 X |
| 3,205,889 | 9/1965 | Alder et al. | |
| 3,280,238 | 10/1966 | Calvert | |
| 3,489,829 | 1/1970 | Lipfert | |
| 3,939,239 | 2/1976 | Valyi | 264/511 |
| 3,994,412 | 11/1976 | Difiglio | |
| 4,075,266 | 2/1978 | Theysohn | |
| 4,216,184 | 8/1980 | Thommas | |
| 4,418,034 | 11/1983 | Nemeskeri | 264/533 X |

FOREIGN PATENT DOCUMENTS

| 56-89928 | 7/1981 | Japan | 264/255 |
|---|---|---|---|
| 57-163544 | 10/1982 | Japan | 264/511 |
| 180772 | 9/1962 | Sweden | 264/DIG. 41 |

*Primary Examiner*—Jan H. Silbaugh
*Assistant Examiner*—Hubert C. Lorin
*Attorney, Agent, or Firm*—Paul C. Flattery; Robert M. Barrett; Mary R. Jankousky

[57] ABSTRACT

A method is disclosed for making containers (40) in which a sheet of thermoplastic material (10) that is adapted to be formed into a pouch is introduced into a mold cavity (14). A molding compound (22) is also introduced into the mold cavity (14). The molding compound (22) is permitted to be bonded with the thermoplastic sheet (10) inside the mold cavity (14) to form a container port (20) in situ. The thermoplastic sheet (10) and bonded molding compound (22) are removed from the mold cavity (14) and the sheet carrying the port (20) formed from the bonded molding compound is folded and cut to form a container (40).

13 Claims, 5 Drawing Sheets

METHOD FOR MAKING CONTAINERS HAVING PORTS

This application is a continuation of application Ser. No. 536,608, filed Sept. 28, 1983, now abandoned.

TECHNICAL FIELD

The present invention concerns a novel method for making containers and a novel container made in accordance with the method.

BACKGROUND ART

In manufacturing sterile containers, such as vinyl containers which contain parenteral solutions and the like, it is conventional to attach to one end of the vinyl film a closure component in the form of a port. The port/closure is typically manufactured by molding it separately from the formation of the vinyl pouch which forms the receptacle portion of the container. After the port/closure is molded, it is bonded to the vinyl film. If an asceptic manufacturing system is required, the closure component will need to be presterilized off-line and asceptically attached to the vinyl film.

We have discovered a novel method for making containers, including a sterile container for medical usage and other types of containers, in which the closure port is extremely simple in construction and is not made separately for subsequent heat welding to the film. In this manner, there are no extra parts, such as separate closure ports, to store and handle, and the contact area of both the port and the receptacle material is automatically sterilized, without the need to presterilize the closure component off-line and thereafter asceptically attach the sterilized component to the film.

In addition, the present invention provides a method that is cost-effective in that there is no secondary heat seal operation of the closure port to the receptacle required. Further, a reliable strong seal is formed in accordance with the method of the present invention and the method is easily susceptible for use in an asceptic form/fill/seal technique.

Still further, using the method of the present invention, contamination through the port is obviated and as a result of the method of the present invention a port cannot be torn from the receptacle portion.

It is, therefore, an object of the present invention to provide a novel method for making containers and container made from this method which is significantly cost-effective and reduces contamination problems.

Other objects and advantages of the present invention will become apparent as the description proceeds.

DISCLOSURE OF THE INVENTION

In accordance with the present invention, a method is provided for making containers comprising the steps of introducing into a mold cavity a sheet of material adapted to be formed into a pouch, injecting into the mold cavity a molding compound, permitting the molding compound to be bonded with the sheet inside the mold cavity to form a container port in situ, and removing the sheet and bonded molding compound from the mold cavity, whereby the molding compound forms a port.

In the illustrative embodiment, the mold cavity is defined by an injection mold having a path for injecting the molding compound into the mold cavity. The injection mold comprises a female die and a relatively movable male die, with the female and male dies cooperating to define the mold cavity. The method also includes the steps of displacing the sheet with the male die so that the interior shape of the port substantially corresponds to the exterior shape of the male die. In addition, the interior shape of the female die defines the exterior shape of the port.

In the illustrative embodiment, the female die interior opening comprises a generally bucket-shape and the male die exterior comprises a generally hill shape. The female and male die shapes are generally symmetrical about a central axis and the male die exterior shape has a generally sinusoidal cross-sectional configuration.

After the thermoplastic sheet material and the molding compound are bonded together in the mold cavity, they are removed from the mold and the sheet material is folded, heat sealed at the seams and cut to form a container.

In accordance with the present invention, a container is formed generally of folded thermoplastic sheet material and it has a port extending outwardly from one end thereof. The port is formed of a molding compound that is formed into the port shape in a mold cavity and is bonded to the sheet material in situ in the mold cavity.

In one form of the invention, the port includes a flange surrounding a main portion and a pair of opposed wings extending from the flange.

A more detailed explanation of the invention is provided in the following description and claims, and is illustrated in the accompanying drawings.

DETAILED DESCRIPTION OF THE ILLUSTRATIVE EMBODIMENT

Figure 1:
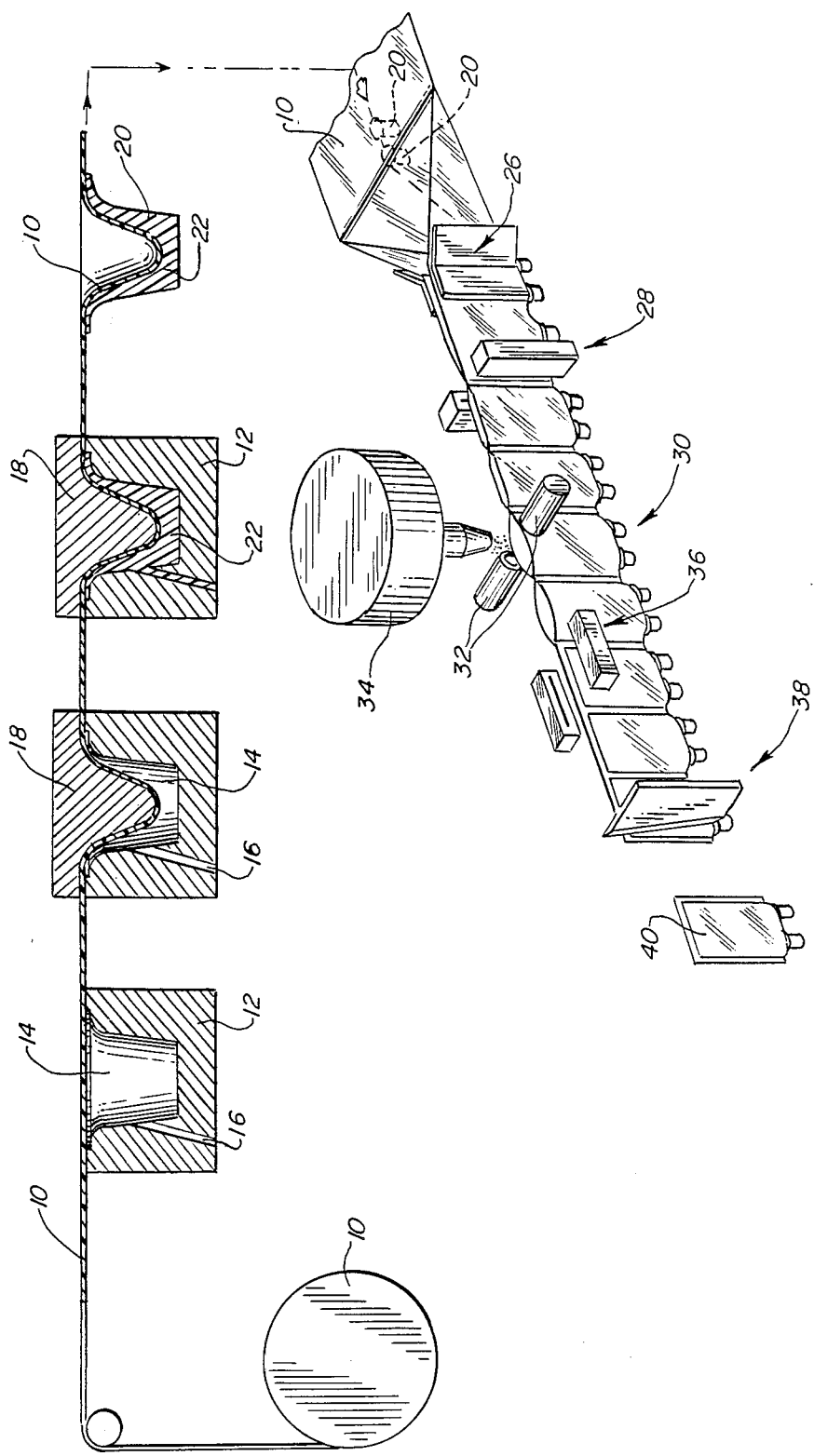
FIG. 1 is a diagrammatic view of a method of making containers in accordance with the principles of the present invention.

Referring to FIG. 1, a continuous sheet of film, preferably polyethylene, is moved over a female die 12 of an injection mold. Female die 12 defines a generally bucket-shaped cavity 14 and also a path 16 for enabling the flow of injected material 22 into cavity 14. Mold cavity 14 generally defines the external shape of the port which will be produced. A male molding die 18 is placed in position and film 10 is heated by male die 18 or the film 10 may be heated prior to entering cavity 14. Heating the film facilitates the shaping and forming of the film to conform to the contours of the molding dies. Male die 18 has a generally hill shape with a generally sinusoidal cross-sectional configuration as illustrated. The female die 12 and male die 18 shapes are generally symmetrical about a central axis.

While film 10 overlies or is within cavity 14, male die 18 is moved into cavity 14 to displace film 10 into the cavity as illustrated. As film 10 remains in the cavity, a rubberized material 22 is injected via path 16 into cavity 14 to form the port and to lend structural rigidity to the exterior of film 10 adjacent the port. At the proper temperature, film 10 and the rubberized material will bond during the injection cycle. Depending on the injection molding method used, the dies may have to be cooled or heated to maintain optimum film-to-rubber bonding temperature.

If the injected material and film 10 are not compatible or do not bond properly to each other, an intermediate member may be carried by film 10 for interposition between film 10 and the molding material in the mold. Additionally, if the fluid to be carried by the container and the rubberized material are not compatible for prolonged exposure with each other, an intermediate film may be interposed between the film 10 and the molding material in the mold.

After the rubberized material and film 10 have become bonded within the mold formed by dies 12 and 18, the resulting bonded product is removed from the mold and a port 20, comprising the rubberized material 22 and the film 10, has been formed. Thus a completed port 20 results once the molding dies are removed.

In the illustrative embodiment, two ports are utilized for each container. Still referring to FIG. 1, it is seen that the film with the ports thereon is fed to a film folding horn 26 where the pouch is formed in a conventional manner. To this end, there is a side sealing station 28 wherein the sides 50, 52 are heat sealed, a filling station 30 wherein the plies are pulled apart by vacuum means 32 and the fluid material is introduced into the pouch by filler 34, an end sealing station 36 in which the bottom end 54 is heat sealed and a cutting station 38 in which each unit is separated to form a completed container 40.

Figure 2:
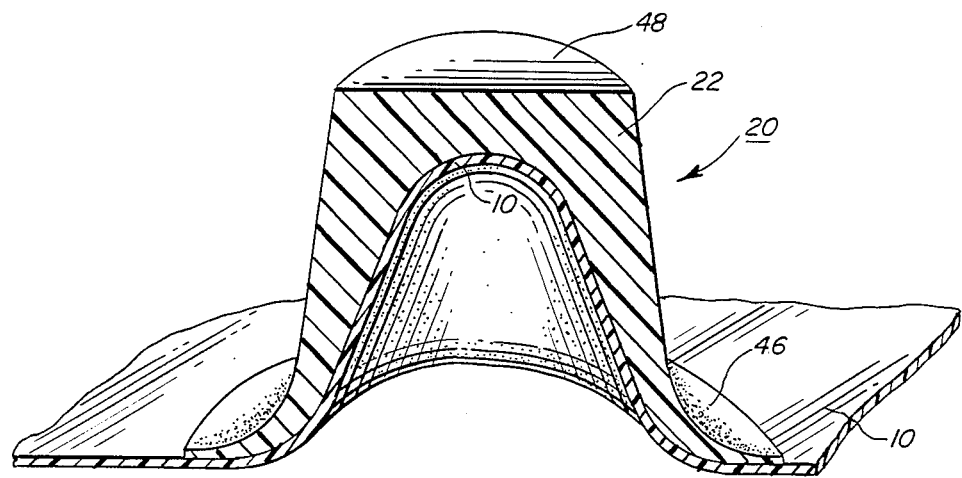
FIG. 2 is an enlarged view, taken partially in cross-section, of a closure/port formed by the method of FIG. 1.

Referring to FIG. 2, the resulting port is shown in detail therein. It can be seen that there is an unusually large contact area between the port material 22 and film 10 which assures a strong seal joint. Additionally, thin flexible flange 46 also assure good seal strength quality. Flange 46 also aids to prevent spiking through the side of the container when a spike is inserted into top 48 of the port, through the port and into the bag. There is no need to provide a separate membrane because film 10 functions as the port membrane.

Another advantage of the port of FIG. 2 is that the long seal length contact of the port material 22 and film 10 minimizes the chances of contaminants traveling to the spiking site between the two members due to partial poor sealing. Of further significance is the fact that by molding the port in situ, the contact area of the port material 22 and film 10 is sterilized within the mold.

Figure 3:
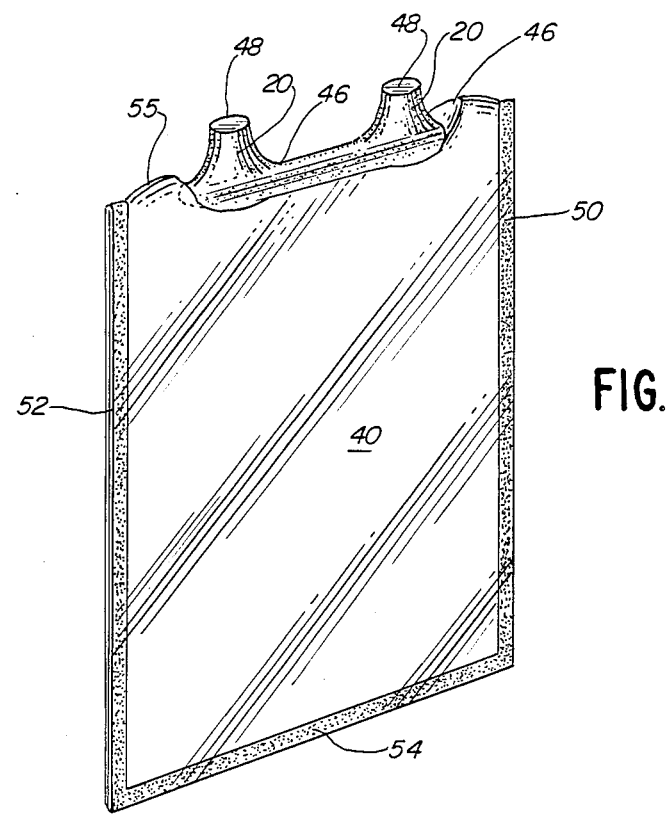
FIG. 3 is a perspective view of a container formed by the method illustrated in FIG. 1.

Container 40 is illustrated in FIG. 3 and it can be seen that the container comprises a pair of ports 20 formed in accordance with the method illustrated in FIG. 1. The receptacle pouch which forms container 40 has a pair of heat sealed side edges 50, 52 and a heat sealed bottom end 54 with ports 20 having been bonded at the opposite end 55.

Figure 4:
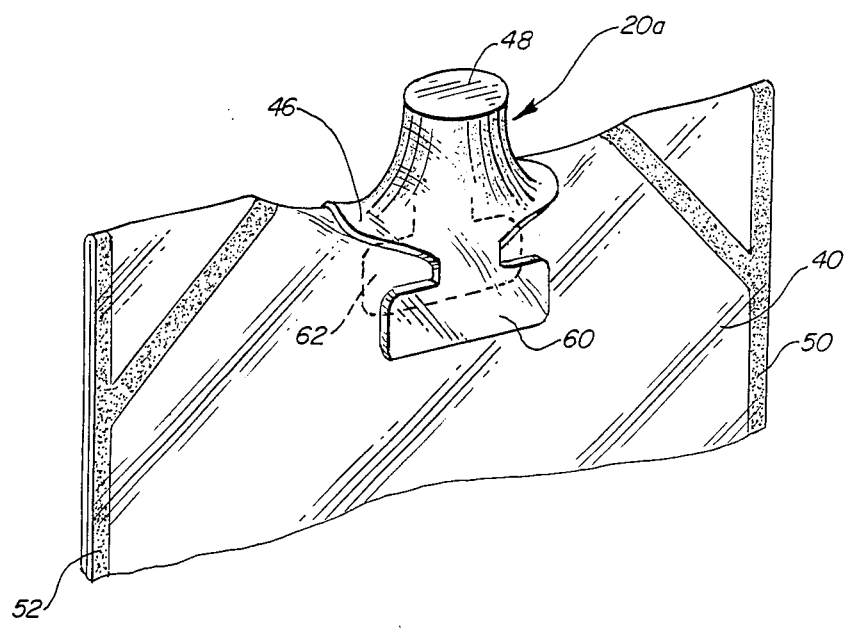
FIG. 4 is a perspective view of a container portion having a modified-shaped port, constructed in accordance with the principles of the present invention.
Figure 5:
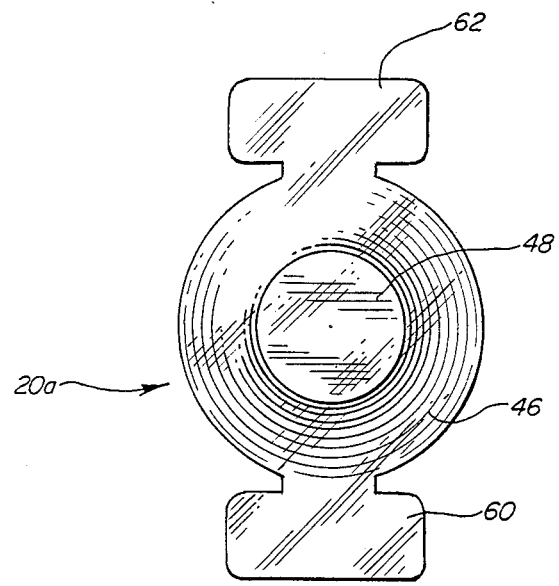
FIG. 5 is a plan view of the port of FIG. 4, with the port wings shown spread open.

In FIGS. 4 and 5, a port 20a is shown, having been formed as described above with reference to FIG. 1, but having wings 62, 60 extending from flange 46. Wings 62, 60 aid in resisting puncturing of the container 40 during spiking, strengthen the port-to-pouch material seal, provide a position finger grip and keep the fingers away from the spiking area to reduce touch contamination, strengthen the pouch material in the port area to give the pouch a uniform appearance, and enhance the visibility of the port and prevent the port from tilting.

It can be seen that a container has been formed in which the port comprises a molding compound that is formed into the port shape in a mold cavity and is bonded to the sheet material in situ in the mold cavity. Although illustrative embodiments of the invention have been shown and described, it is to be understood that various modifications and substitutions may be made by those skilled in the art without departing from the spirit and scope of the present invention.

That which is claimed is:

1. A method for making containers having ports from a sheet of material comprising the steps of:
   providing an injection mold defining a mold cavity in the general shape of a container port and a path for injecting a molding compound into the mold cavity;
   passing the sheet of material over the injection mold;
   introducing into the mold cavity only a portion of the sheet of material adapted to be formed into a container;
   while said portion of the sheet is inside the mold cavity, injecting into the mold cavity a molding compound;
   permitting the molding compound to be bonded with the portion of the sheet inside the mold cavity to form a container port and port membrane in situ;
   removing the portion of the sheet and bonded molded compound from the mold; and
   processing the sheet carrying the port to form a container.

2. A method as described in claim 1, wherein the sheet comprises a film of thermoplastic material.

3. A method as described in claim 1, including the steps of providing an injection mold having a female die and a relatively movable male die, the female and male dies cooperating to define the mold cavity, the female die interior opening comprising a general bucket-shape and the male die exterior comprising a general hill shape.

4. A method as described in claim 3, wherein the female and male die shapes are generally symmetrical about a central axis and the male die exterior shape has a generally sinusoidal cross-sectional configuration.

5. The method of claim 1 including the step of moving a male die towards the mold cavity to introduce the sheet of material into the mold cavity.

6. A method as described in claim 5, including the step of providing a female die that defines the shape of the port.

7. The method of claim 1 including the steps of:
   folding the sheet carrying the port;
   sealing sides of the sheet carrying the port to create side seals;
   filling the sealed sheet with fluid;
   sealing an end of the sealed sheet to create an end seal; and
   separating the sealed sheet from a remaining portion of the sheet.

8. A method for making containers having ports from a continuous sheet of material comprising the steps of:
   providing an injection mold defining a mold cavity in the general shape of a container port and a path for injecting a molding compound into the mold cavity;
   positioning over a female die a continuous sheet of material;

introducing into the female die of the mold cavity a portion of the sheet of material by displacing the sheet with a male die;

while said portion of said sheet is inside the mold cavity, injecting into the mold cavity a molding compound;

allowing the molding compound to be bonded to the sheet without puncturing the sheet to create a port and port membrane;

removing the sheet and bonded molding compound from the mold; and processing the sheet carrying the port to form a container.

9. A method for making sterile containers with ports comprising the steps of:

introducing into a mold cavity a continuous sheet of material adapted to be formed into a container;

injecting into the mold cavity a molding compound;

permitting the molding compound to be bonded with the sheet inside the mold cavity to form an interior port and port membrane in situ;

removing the sheet and bonded molding compound from the mold cavity, whereby the molding compound forms a port; and processing the sheet carrying the port to form a sterile container.

10. A method as described in claim 9, including the steps of introducing only a portion of the sheet into the mold cavity and interposing an intermediate bonding member in the mold between the sheet and the molding compound to aid in the bonding of the molding compound with the sheet.

11. A method as described in claim 9 including the step of injecting molding compound along a path in the mold cavity.

12. A method as described in claim 11, wherein the injection mold comprises a female die and a relatively movable male die, the female and male dies cooperating to define the mold cavity, and including the step of displacing the sheet with the male die whereby the interior shape of the port substantially corresponds to the interior shape of the male die.

13. A method as described in claim 12 including the step of providing a female die that defines the shape of the port.

* * * * *